United States Patent
Moreira et al.

(10) Patent No.: US 12,031,526 B2
(45) Date of Patent: Jul. 9, 2024

(54) PORTABLE WIND TURBINE

(71) Applicant: AUREA TECHNOLOGIES INC., Ottawa (CA)

(72) Inventors: Catherine Lydia Moreira, Prospect (CA); Rachel Elizabeth Carr, Halifax (CA); Stephen Alan Haythorn Robertson, Halifax (CA)

(73) Assignee: AUREA TECHNOLOGIES INC., Ontario (CA)

( * ) Notice: Subject to any disclaimer, the term of this patent is extended or adjusted under 35 U.S.C. 154(b) by 0 days.

(21) Appl. No.: 17/551,751

(22) Filed: Dec. 15, 2021

(65) Prior Publication Data

US 2022/0290656 A1 Sep. 15, 2022

(30) Foreign Application Priority Data

Nov. 19, 2020 (CA) .................................. CA 3099992

(51) Int. Cl.
*F03D 80/80* (2016.01)
*F03D 1/06* (2006.01)
(Continued)

(52) U.S. Cl.
CPC ........... *F03D 80/80* (2016.05); *F03D 1/0608* (2013.01); *F03D 1/0675* (2013.01); *F03D 9/25* (2016.05); *F03D 13/10* (2016.05)

(58) Field of Classification Search
CPC ...... F03D 80/80; F03D 1/0608; F03D 1/0675; F03D 9/25; F03D 13/10
(Continued)

(56) References Cited

U.S. PATENT DOCUMENTS 4,801,243 A * 1/1989 Norton ...................... B63H 1/20
  416/142
8,299,645 B2 * 10/2012 Muchow ................. F03D 13/10
  290/55
(Continued)

FOREIGN PATENT DOCUMENTS

CN  208380752 U     1/2019
DE     2802720 A1 *  7/1979  ............... F03D 1/06
(Continued)

OTHER PUBLICATIONS

Examination Report dated Mar. 28, 2024, for Application GB2200036.8.

*Primary Examiner* — Charles Reid, Jr.
(74) *Attorney, Agent, or Firm* — The Dobrusin Law Firm P.C.

(57) ABSTRACT

A portable wind turbine, consisting primarily of a nacelle with collapsible blades for transportation is provided. Each of these collapsible rotor blades has been designed with an impellor, or propeller, twist. This is typical of wind turbine blades in order to maximize torque and reduce drag during operation, with the exception that said blades also conform to the nacelle's surface, which is one of a solid of revolution shapes, for transportation of the turbine. The described portable wind turbine assembly is accompanied with collapsible mounting apparatus, for internal or external storage to the turbine's nacelle, wholly or partially stored control electronics within the nacelle, as well as an optional energy storage component that is located internally or externally to the turbine's body. This turbine invention can be person-portable, deployed on vehicles, trailers, marine vessels and structures, above water, or used for locations where storm-strength winds are a risk.

32 Claims, 8 Drawing Sheets

(51) Int. Cl.
  *F03D 9/25* (2016.01)
  *F03D 13/10* (2016.01)
(58) Field of Classification Search
  USPC .................................................. 290/44, 55
  See application file for complete search history.

(56) References Cited

U.S. PATENT DOCUMENTS

| | | | | |
|---|---|---|---|---|
| 2006/0127210 | A1* | 6/2006 | Buttler | F03B 17/061 |
| | | | | 415/7 |
| 2010/0140949 | A1* | 6/2010 | Pitre | F03D 13/20 |
| | | | | 290/55 |
| 2010/0143131 | A1* | 6/2010 | Pitre | F03D 7/0236 |
| | | | | 416/85 |
| 2010/0301607 | A1* | 12/2010 | Morimoto | F03D 7/0268 |
| | | | | 416/142 |
| 2012/0007365 | A1* | 1/2012 | Harrison | E04H 3/10 |
| | | | | 290/55 |
| 2013/0039767 | A1* | 2/2013 | Schrickel | F03D 13/40 |
| | | | | 416/153 |
| 2017/0152837 | A1* | 6/2017 | Anemaat | H02S 20/30 |
| 2019/0226452 | A1* | 7/2019 | Pitre | F03D 7/0236 |

FOREIGN PATENT DOCUMENTS

| | | | | |
|---|---|---|---|---|
| EP | 3754180 B1 * | 3/2022 | ......... | B63B 15/0083 |
| FR | 2933753 A1 * | 1/2010 | ........... | F03D 1/0658 |

* cited by examiner

PORTABLE WIND TURBINE

CROSS-REFERENCE TO RELATED APPLICATIONS

This application claims the benefit of priority to Canadian Patent Application No. 3,099,992, filed Nov. 19, 2020, the contents of which are hereby incorporated by reference.

FIELD OF THE INVENTION

The present invention pertains to the field of wind turbines and in particular to wind turbines that are able to be transported and deployed without permanent installation.

BACKGROUND

As the usage and energy density of batteries increase, a need for portable energy systems is apparent in a range of different industries and applications. According to Eckard, Robert. BCC Research, 2019, *Portable Battery-Powered Products: Global Markets*, available at www.bccresearch.com, the international market for portable battery-powered products was $1 trillion in 2019 and is expected to grow at a compound annual growth rate (CAGR) of 7.6% to reach $1.5 trillion by 2024.

Generating electricity to recharge these battery-powered devices is a challenge since both portable non-renewable and renewable systems have technical and logistical issues for this purpose. Non-renewable energy systems that are specifically designed for delivering power to rechargeable batteries rely on obtaining the supply of the energy source, such as fuels, gases, etc. The cost, transportation, and consumption of these energy sources can be problematic for end users. Renewable energy sources, such as hydro and solar, resolve some of these issues since transportation is irrelevant, and cost of the supply is low or non-existent. However, renewable sources have their limitations. Hydro power is limited by its inability to provide energy outside of certain geographical locations, such as places without wave or river access. Solar, although widely used in the portable-power space due to its accessibility, is only able to produce power during the light hours of the day and has relatively-low power production abilities since the outputted energy is singularly proportional to the amount of sunlight projected onto the area of the panel. A renewable source that is not confined to the same restraints as hydro and solar is wind energy. Wind is accessible in almost all locations and can potentially produce power 24 hours a day. For a wind turbine, the power produced has a cubic relationship with wind speeds. Meaning that as wind speeds double, power output increases eight times. An additional advantage of a portable wind turbine system would be that in the occurrence of gale force or hurricane winds, the turbine would be stowed away until the wind speeds decrease within the turbine's operation range.

The reason why wind turbines are not widely used in the portable-power space is that developing a portable solution generally results in sacrificing power output efficiency. Previous attempts at portable wind turbines were unable to develop aerodynamically-efficient rotor blades within the assembly, integrate a yaw mechanism that enables the turbine to turn into the true wind, and produce the required swept area within the portable arrangement—an important aspect since power output is squarely proportional to the turbine's rotor diameter. Additional considerations for lack of functionality include absence of tower or mount for the turbine to be properly elevated from, increased noise from induced vortices, and incorrect pairing of turbine design to corresponding wind speeds or Reynolds Numbers.

Therefore, there is a need for a method and apparatus for a portable wind turbine that overcomes one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for a portable wind turbine that has been developed for portability without sacrificing overall power efficiency. Embodiments of the invention accordingly provide for a collapsible wind turbine having blades that are designed with a progressive twist along the length of the blade, while also conforming to the turbine's nacelle body. The nacelle body has been designed as a solid of revolution shape to provide aerodynamic efficiency.

In accordance with embodiments of the present disclosure, a portable wind turbine is provided. A portable wind turbine includes a curve-shaped nacelle, a drive hub attached to the nacelle, and a plurality of rotor blades attached to the drive hub to rotate the hub when wind is forced upon the blades. The blades are curved and/or twisted so as to provide adequate (e.g. substantially maximal) torque with limited (e.g. substantially minimal) drag. In an operating configuration each blade extends generally radially outward from the drive hub in a radial direction. The curve and/or twist may be in the radial direction such that, as one progresses radially outward along a blade, the angular orientation of the blade changes. Curvature of the blade can be in the sense that a main axis of the blade follows a curved path. The main axis is a central line which runs through the center of the blade from an innermost end at which the blade is attached to the drive hub to an outermost end which is furthest from the drive hub. Twisting of the blade can be in the sense that the direction at which the blade extends outward from its main axis progressively changes so that this direction is different at different locations along the main axis.

The rotor blades (also referred to as turbine blades), either detachable or permanently fixed to the drive hub, are reconfigurable between the operating configuration and a transportation configuration. In the operating configuration, the blades are mounted to and extend radially outwardly from the drive hub, with the radial direction being defined relative to an axis of rotation of the drive hub. In the transportation configuration, the blades are disposed against and conform to the nacelle's exterior surface, for example to fit within one of more open cavities on the nacelle's surface. The turbine's drive hub may be operatively coupled to a generator which may be housed within the nacelle to generate electrical current when the blades rotate the drive hub. The internal generator may be connected to electronic control circuitry within, or partially within, the nacelle. The electronic control circuitry may connect either to an energy storage component housed within the nacelle or to an electronic device external to the turbine. The wind turbine, along with collapsible mounting apparatus with no permanent installation required, may be arranged in the operating configuration to pivot into the prevailing direction of the wind when mounted on top of the extended mounting apparatus. In the transportation configuration, the wind turbine may have the collapsed mounting apparatus either stowed within, or against, the turbine's nacelle, or stored separately from the nacelle. The described portable wind turbine may be person-portable or able to be deployed independent of a utility electrical grid, on a vehicle, on a trailer, on a marine vessel, on a marine structure, on a buoyant structure, above a body of water, or in a location susceptible to gale force or hurricane force winds.

In accordance with embodiments of the present disclosure, a set of claims and accompanying drawings to detail method and assembly of a portable wind turbine are provided.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments of the present invention provide for the method and assembly of a highly efficient, portable wind turbine.

Figure 1:
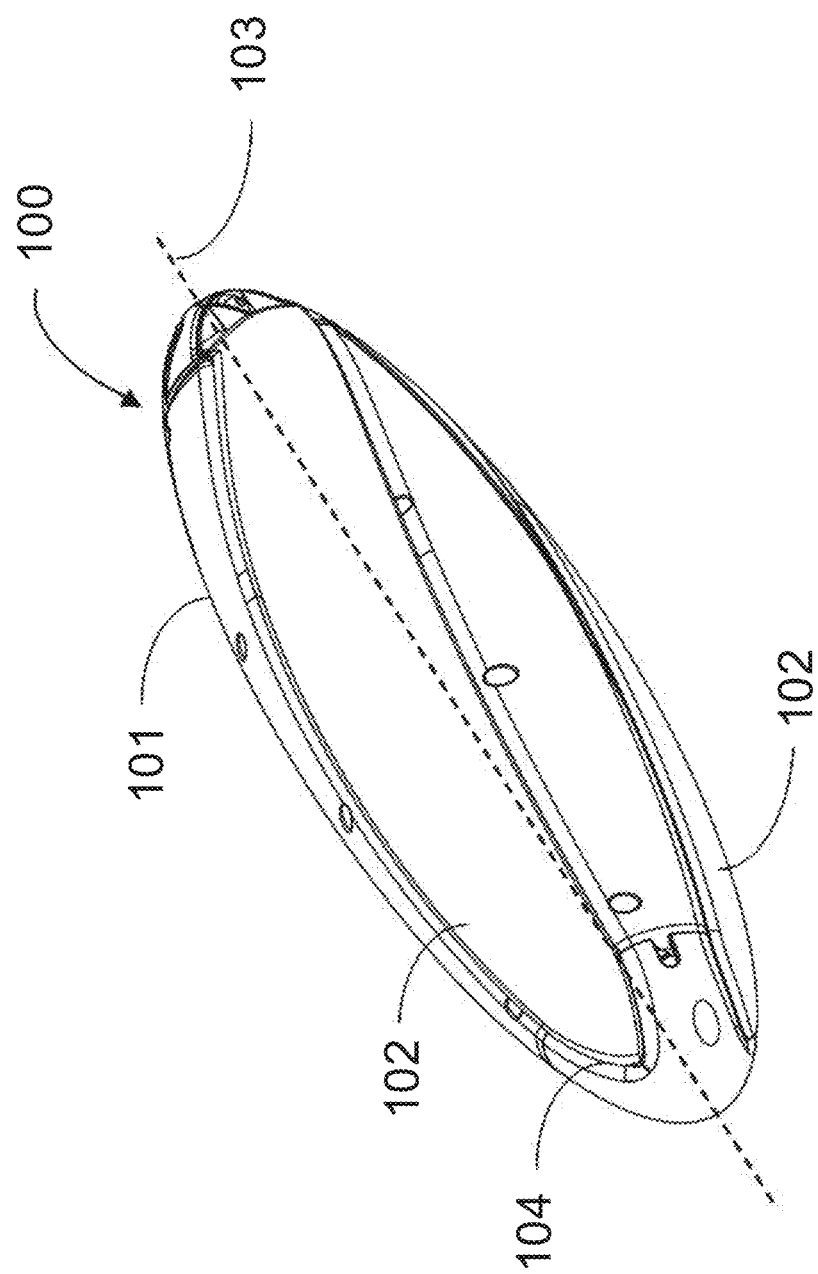
FIG. 1 is a side view of the described portable wind turbine while in transportation configuration, according to an embodiment of the present invention.

FIG. 1 illustrates a wind turbine according to an embodiment of the present invention while in transportation configuration 100. In this embodiment, the transportation configuration 100 demonstrates the shape and curvature of the turbine's nacelle 101, which has been developed for aerodynamic performance through induced drag reduction as wind flows over the body. The described nacelle may be produced from revolution of a convex shape, wherein the shape of the nacelle is substantially symmetric about the axis of rotation along the longest length 103 of the nacelle 101. Accordingly, the nacelle shape may be approximately describable as a solid of revolution. One example of a suitable convex shape is an ellipse. Another example of a suitable convex shape is a shape with a generally flat leeward face (proximate to the blades) and opposing sides which are substantially parallel to one another near the leeward face and then taper inward toward one another away from the leeward face. This can produce a generally "bullet-shaped" solid of revolution. In transportation configuration 100, one or more rotor blades 102 are disposed against and conform to the exterior of the nacelle's surface. The rotor blades may be folded inward into this position by pivoting them about a pivotable attachment point which attaches the rotor blades to the wind turbine's drive hub. For each rotor blade 102 there is one corresponding dedicated location on the surface of the nacelle for accommodating the rotor blade when in transportation configuration 100. These dedicated locations along the surface of the nacelle contain open cavities 104 which are configured to house, for example closely fittingly accommodate, one of the blades.

The rotor blades are resilient in the sense that they may have some flexibility but, if flexed, tend to return to their original shape. In other words, the rotor blades may potentially be elastically deformable but are typically not plastically deformable.

Alternatively, one or more of the open cavities 104 can have a depth which is configured to accommodate multiple blades. The open cavities assist in protecting the blades during transport. Alternatively, the open cavities may be omitted and the nacelle's surface may be substantially smoothly convex. It is noted that the rotor blades 102 helically wrap around the nacelle due to their twist and/or curvature.

Figure 2:
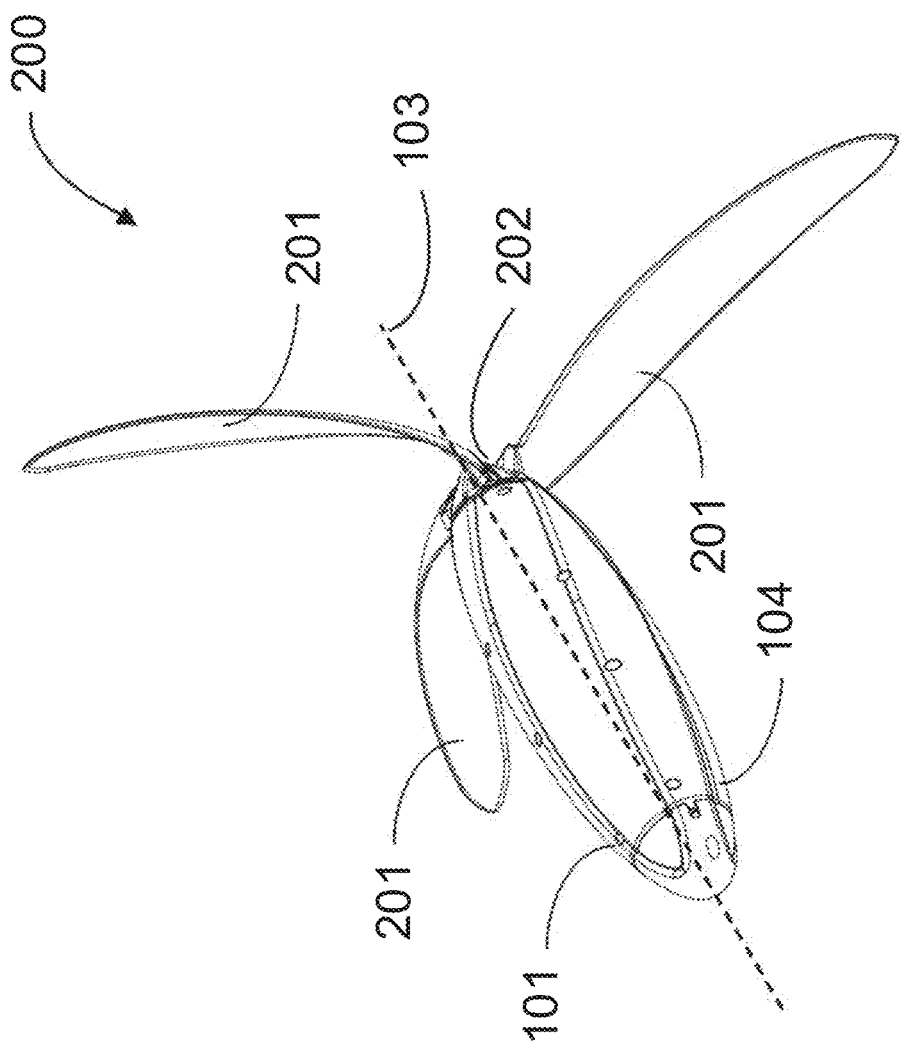
FIG. 2 is a side view of the described portable wind turbine while in operating configuration, not including mounting apparatus assembly, according to an embodiment of the present invention.

FIG. 2 demonstrates the described portable wind turbine while in operating configuration 200, independent of mounting apparatus assembly. A drive hub 202, rotatably connected internally within the turbine's nacelle, has constant external curve with the revolution of shape which consists of the turbine's nacelle 101. In other words, the profile of the wind turbine is contiguous between the nacelle and the drive hub, and the nacelle and drive hub together present a desired aerodynamic shape. In the operating configuration 200, the plurality of rotor blades extends radially in their respective outward directions from the drive hub 202 when deployed from the turbine's transportation configuration. That is, the rotor blades 201 extend radially outward, in a radial direction, from the axis of rotation 103 of the drive hub 202. The drive hub has rotational torque induced around the axis of rotation 103 when wind is forced against the blades. In the operating configuration 200, the plurality of rotor blades 201 leave the nacelle's surface cavities 104 exposed but will return to the cavity openings when reconfiguring (transitioning) back to transportation configuration 100.

As can also be seen in FIG. 2, at the innermost part of the blades, close to the drive hub, the blades are oriented so that the widest face is substantially or nearly parallel to true wind. At the outermost tip of the blades, most distant from the drive hub, the blades are oriented so that the widest face is substantially or nearly perpendicular to true wind.

In various embodiments, the cavities are shaped and have depth which is configured such that the aerodynamic properties of the nacelle are not impacted or are negatively impacted only to a limited degree. For example, the cavities may be configured to be as shallow as possible, and possibly with sidewalls having a gradual slope.

As will be readily understood by a worker skilled in the art, the drive hub, also referred to as the rotor hub, connects to and is rotated by the rotor blades, the rotation being used to power a generator or other device either directly or through a drive train.

Figure 3:
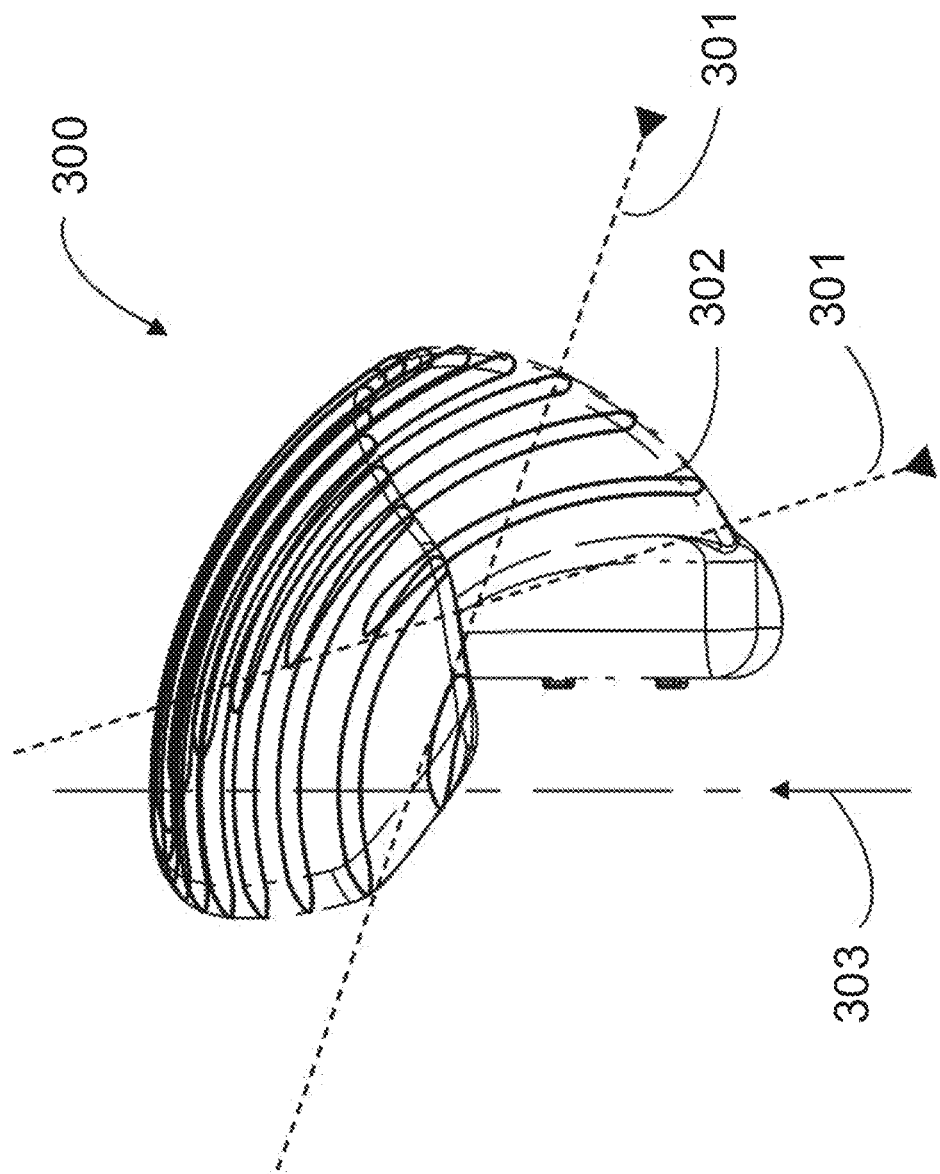
FIG. 3 is a top view of a rotor blade with cross sections being shown along the length of the blade, according to an embodiment of the present invention.

FIG. 3 illustrates a top view of a rotor blade with cross sections 302 being indicated along the length of the blade 300 while demonstrating the blade's progressive twist. The progressive twist is in the radial direction, meaning that, in the operating configuration, as the distance from the turbine's axis of the rotation changes, the angular orientation of the blade changes. The rotor blade, which is twisted and curved along its length, is shaped to provide for one or more constant aerodynamic characteristics to increase (e.g. maximize) torque and reduce vortices. These aerodynamic characteristics may include a constant angle of attack relative to the direction of the apparent wind 301 acting along the blade during rotation, as well as potentially also consisting of a constant camber and constant pitch. As will be readily understood by a worker skilled in the art, apparent wind, which results from true wind combined with relative air motion due to rotor blade rotation, will be different at different distances from the drive hub. By twisting the blade, the angle of attack at each distance from the drive hub can be made substantially constant by accounting for this progressive change in apparent wind.

With a constant angle of attack for apparent wind 301, the resulting correlation is a variable angle of attack in relation to true wind 303.

For further clarity, camber can be defined as the ratio of the height of an arch to the length of a chord subtending the arch. In this context the cross section of the blade may be arched in shape. The arch can have a constant thickness or a variable thickness. The arch can resemble a cambered plate or an airfoil. Accordingly, the rotor blade cross sections (taken for example in a direction parallel to the rotor axis, or alternatively taken in a different direction such as a direction perpendicular to the rotor axis or in a direction between the parallel and perpendicular directions) can be symmetric or asymmetric.

In various embodiments, at each such cross section of the rotor blade, an angle θ between the chord line subtending the blade and the axis of rotation of the rotor axis, where r is distance from the axis of rotation, P is the pitch, and α is a desired angle of attack relative to apparent wind, may be given at least approximately by:

$$\theta = \tan^{-1}\left(\frac{r}{P}\right) + \alpha.$$

Figure 4:
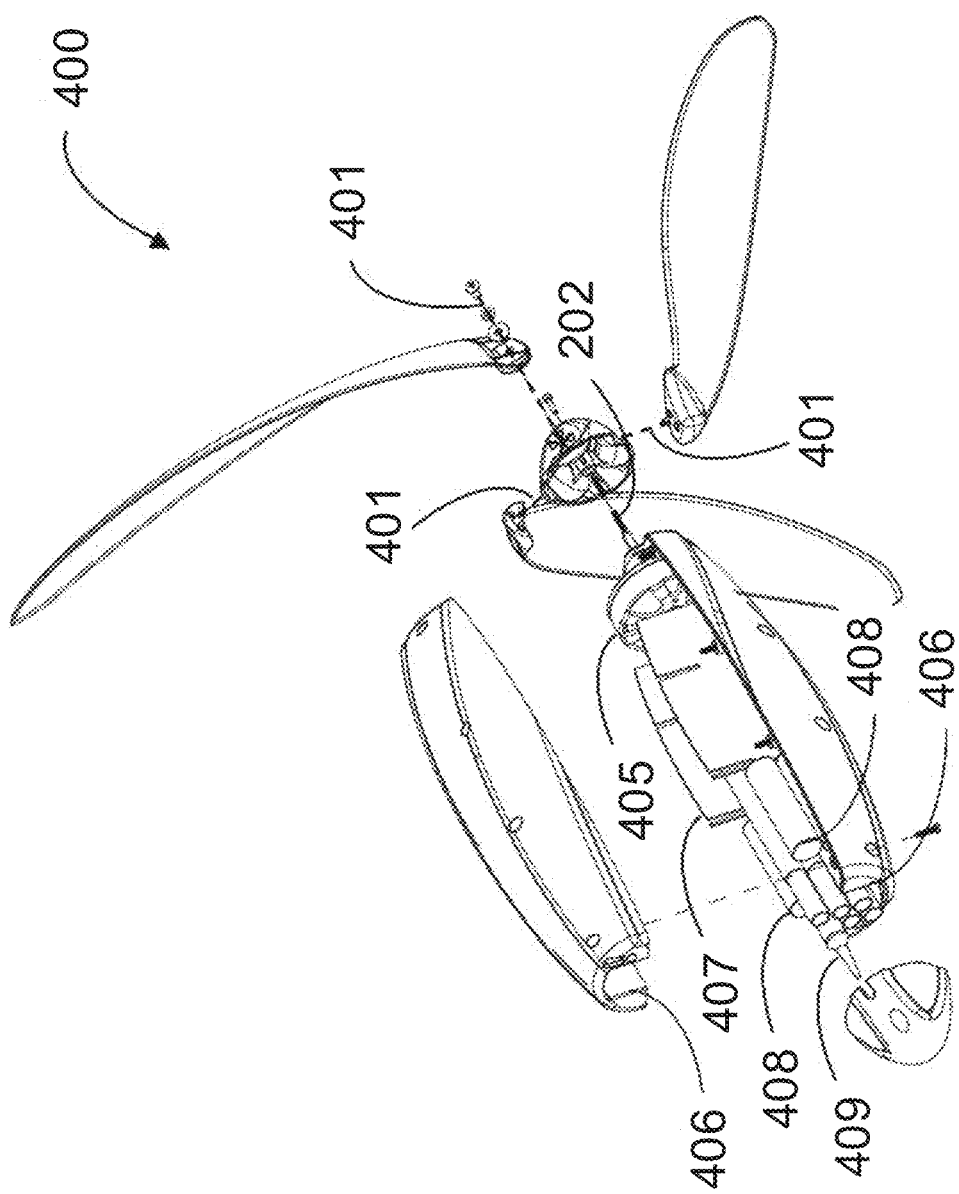
FIG. 4 is an exploded view of the turbine's assembly while rotor blades are in the operating configuration and a mounting apparatus is in stowed configuration, according to an embodiment of the present invention.

FIG. 4 shows an exploded view 400 of the turbine's assembly with blades that are in operating configuration and the turbine's mounting apparatus is in transportation configuration. The turbine's drive hub 202 illustrates a mechanical connection to an electrical generator 405, wherein electrical energy is produced when the drive hub rotates the generator as a result of blades spinning in wind. To reconfigure (transition) the blades to and from operating configuration and transportation configuration, the rotor blades are pivoted around the point at which the blades connect to the drive hub until the rotor blades are folded or extended. A pivotable connection means 401 is illustrated, in the form of a bolt or similar assembly of parts. The blades can be attached to the drive hub using such bolts. To reconfigure the blades, the bolts may be loosened to allow the blades to pivot about the bolt-on connection point.

It is also noted that, in the illustrated embodiment, the base part of each rotor blade bulges outward, with an abrupt transition to the fin part of the rotor blade. This feature forms an approximately hooked shape. In the transportation configuration, the transition from the base part to the fin part may rest against the front of the nacelle, thus assisting in holding the rotor blades in place.

Figure 5:
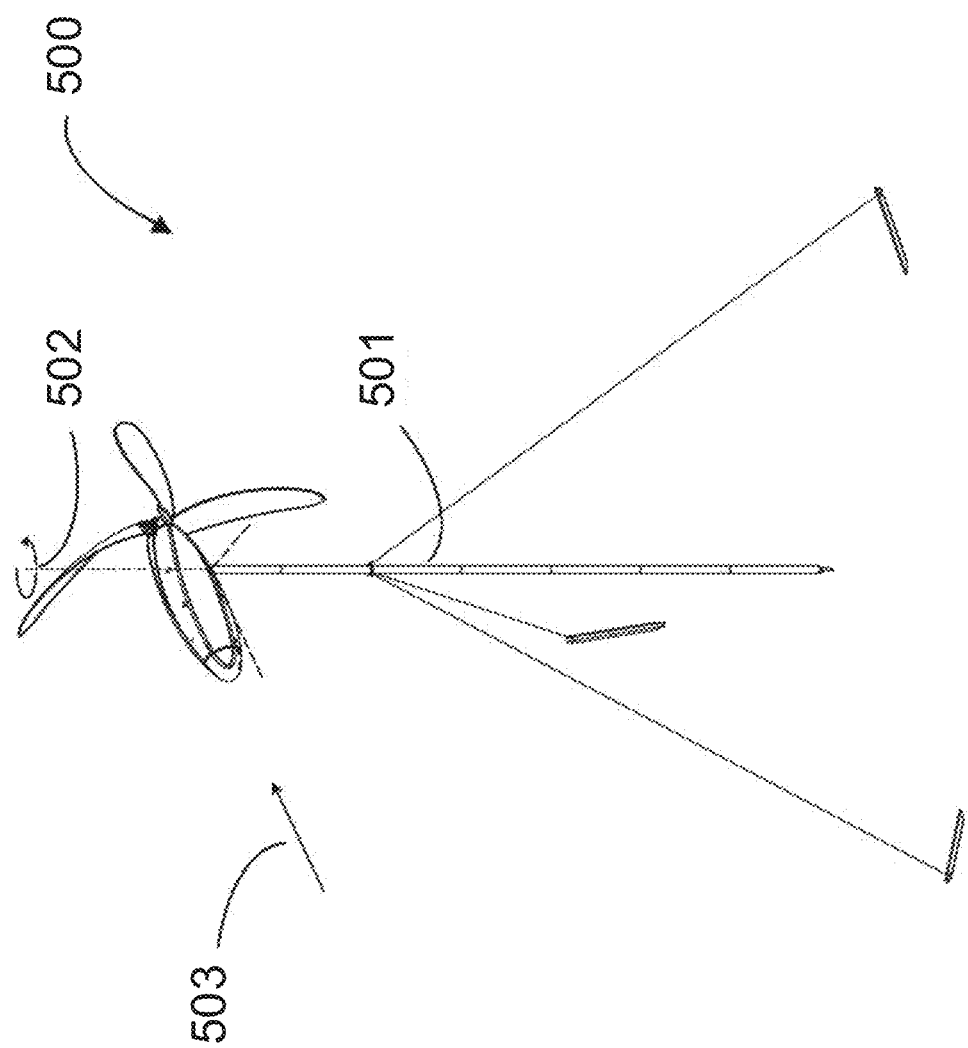
FIG. 5 is an illustration of the fully deployed portable wind turbine with yaw rotation dependent on wind direction, according to an embodiment of the present invention.

Alternatively, the blades may be removed from the drive hub entirely for placement into their locations of the transportation configuration. Locking or stabilizing means (not shown) may be included to help retain the blades in the operating configuration. The electricity-producing generator 405, located within the nacelle and adjacent to the drive hub, is electrically connected to (e.g. electronic) control circuitry 407 housed within the nacelle. Said circuitry 407 is then electrically connected to adjacent energy storage 408 (e.g. an electricity storage component such as a battery or supercapacitor) also housed internally within the nacelle. The energy storage 408 can be removable or non-removable. Alternatively, the energy storage 408 can be separate from the nacelle. At the opposite end of the nacelle from the generator 405, is an opening to an interior (internal storage) compartment 406. A removable, aerodynamic shaped cap can be provided which covers the opening to the internal storage compartment. Within the internal compartment 406, is the turbine's mounting apparatus 409 in an undeployed, stowed, and collapsed configuration. The mounting apparatus can be in the form of a collapsible tripod or post with supporting guy-wires, for example. The internal storage, along with the transportation configuration of the blades, provides for a convenient form factor of the turbine for transport. The mounting apparatus can be reconfigurable between an undeployed configuration (as shown in FIG. 4) and a deployed configuration (as shown in FIG. 5). In the undeployed configuration the mounting apparatus is collapsed for storage. In other embodiments, the mounting apparatus can be stored separately from the nacelle when in the undeployed configuration.

FIG. 5 shows the fully deployed portable wind turbine 500 with an automatic yaw that pivots into the wind similarly to a weathervane. Supporting the turbine in this configuration, is the fully extended, deployed mounting apparatus 501 which supports and elevates the nacelle while providing a vertically-aligned pivot point 502 upon which the turbine is mounted, thereby allowing the turbine to rotate into the direction of the true wind 503 (such that the axis of the drive hub is parallel with true wind and the rotor blades are downwind of the nacelle). As is evident in FIG. 5, the turbine is configured as a downwind turbine, such that the blades are downwind of the nacelle. However, other embodiments of the present invention can provide for an upwind turbine. An upwind turbine may further include differently shaped blades (e.g. with a different amount of twist), and a yaw control mechanism such as a tail or fin located at the opposite end of the nacelle from the rotor blades. The blades in such an upwind turbine may be arranged, in the operational configuration, such that their faces are facing away from the opposite end of the nacelle to the drive hub.

The nacelle can be configured to pivot to turn into true wind due to wind energy, for example due to aerodynamic properties. Additionally, or alternatively, a separate pivoting actuator can be provided which pivots or assists in pivoting the nacelle into true wind.

Figure 6:
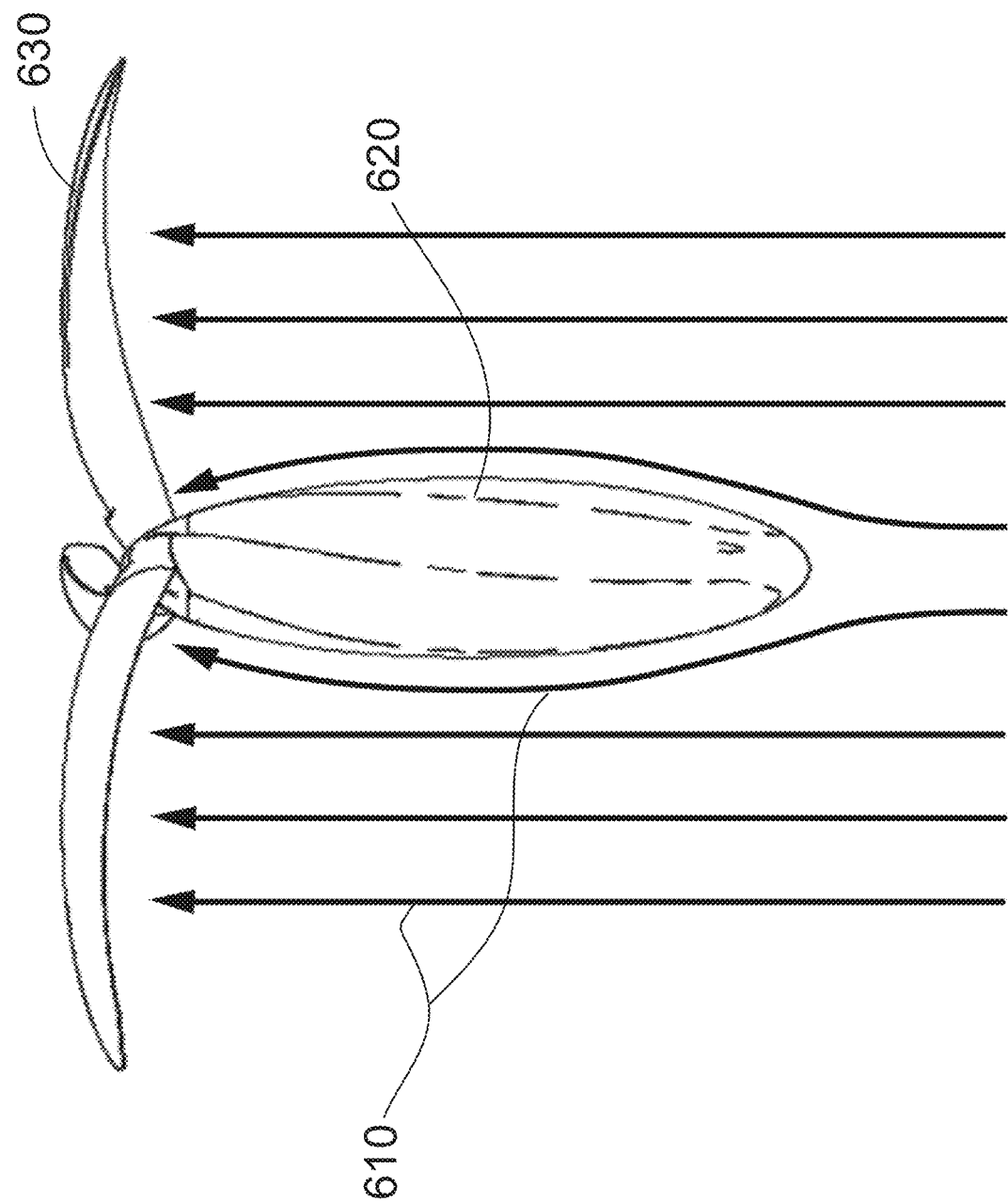
FIG. 6 is an illustration showing airflow near the turbine according to an embodiment of the present invention.

FIG. 6 illustrates airflow near the turbine, configured as a downwind turbine, according to an illustrative embodiment of the present invention. In this downwind turbine arrangement, the turbine has been engineered for overall energy conversion efficiency from the potential wind energy, as well as space and weight requirements. An improved energy extraction performance can potentially be achieved due to the aerodynamic nacelle body that reduces drag and vortices on the leading wind side of the turbine rotor. FIG. 6 illustrates in particular the air current, shown by lines 610, around the body of the nacelle 620, which creates a streamlined effect. This streamlined effect may cause a reduced drag where air encounters the base of the blades 630 aft of the turbine body.

Figure 7:
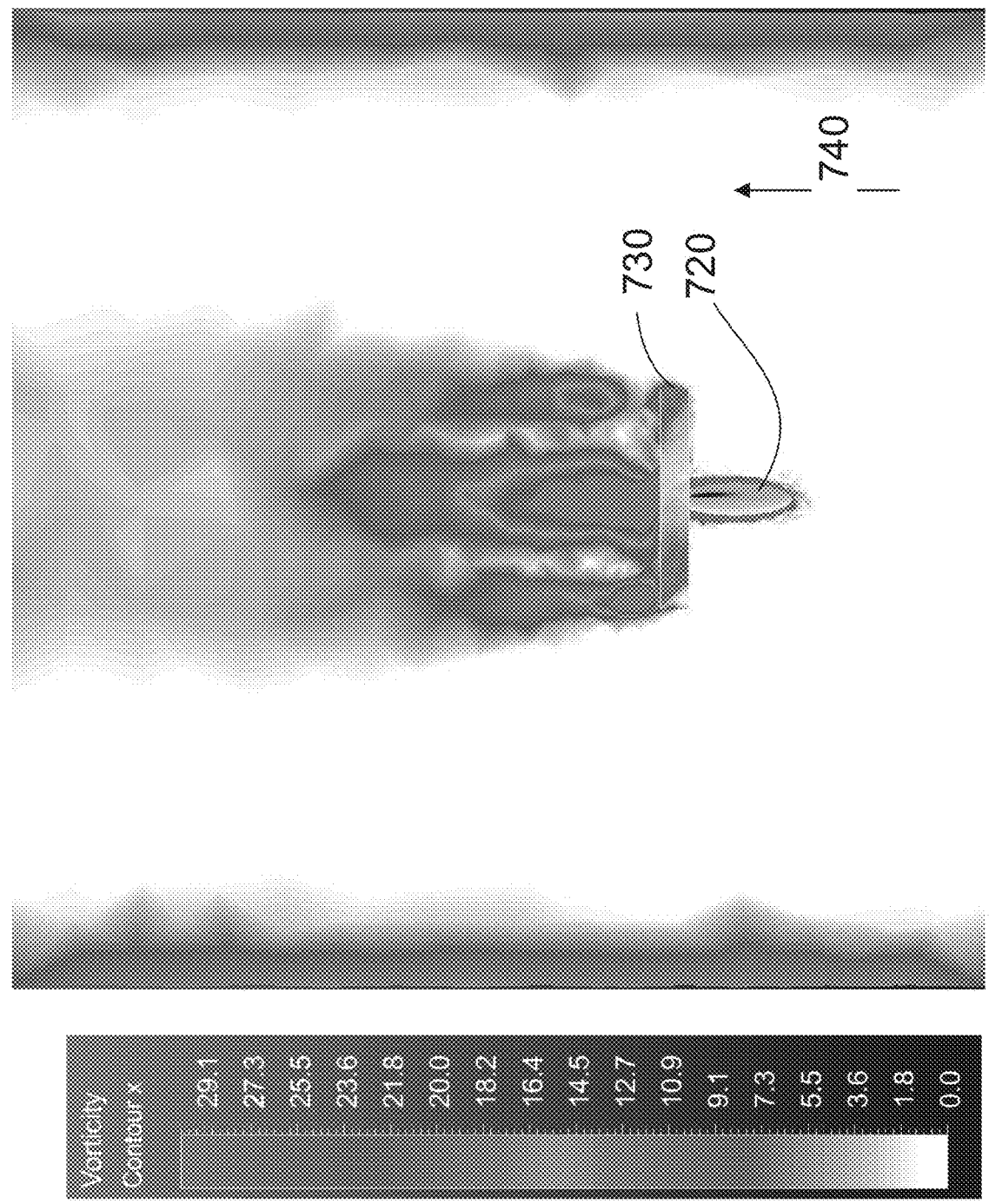
FIG. 7 illustrates results of a computational fluid dynamics analysis showing airflow near the turbine according to an embodiment of the present invention.

A good efficiency has been verified in the downwind turbine arrangement of FIG. 6 through extensive Computational Fluid Dynamics (CFD), wind tunnel, and environmental testing. FIG. 7 illustrates results of a computational fluid dynamics analysis showing airflow near the turbine according to an illustrative embodiment of the present invention. More particularly, FIG. 7 shows the results of CFD simulations run on an ellipsoid nacelle body 720 with blades 730 configured as cambered plates, in the downwind orientation. The shaded patterns around the turbine illustrate a vorticity contour with values from zero to over 29, as shown in the illustrated scale. It is noted that low vorticity occurs close to the nacelle body 720 and on the windward side of the blades 730. A general direction of wind flow 740 is also shown. In this embodiment, a low degree of separation occurs between the laminar wind flow and the turbine body which results in a low vorticity at the roots of the blades. The air flow is visibly directed inwards towards the axis of rotation, rather than being shed around the wake of the nacelle. A time value associated with the illustrated vorticity contour is 3 seconds. FIG. 7 is shown to scale, with the diameter of the blade section 730 being approximately 65 cm.

The efficiency of the ellipsoid nacelle design with cambered plates aft of the turbine body has been demonstrated during extensive field testing. At wind speeds of 43 km/h, the average impeller efficiency of this design, with a blade length of 30 cm, was determined to be 21%. This is significantly higher than other person-portable wind turbines on the market today and known to the inventors. Additionally, the reduction in vortices around the base of the blades may not only improve the efficiency but may also reduce noise emissions from the turbine while in operation. During the mentioned 43 km/h wind speed tests, the turbine produced no more than 50 dB of noise coming from the rotor.

Accordingly, embodiments of the present invention provide for a nacelle shape that not only may provide a contoured surface which conforms to the concave faces of the blades, but that also provides a streamlined aerodynamic surface which results in an efficient design and facilitates smooth airflow around the nacelle and toward the base of the blades. In various embodiments, as illustrated above, when the blades are downwind of the nacelle in an operating configuration, air flows relatively smoothly near the nacelle and toward the blades, due to the nacelle's aerodynamic shape. Air may thus be effectively funneled or concentrated along the nacelle's surface as it flows toward the blades, particularly at the blade base.

Certain aspects of the invention will now be described in more detail for further clarity. In various embodiments, the rotor blades are progressively twisted about a line or curve which runs the length of the blade in the radial direction from base to tip. This twist provides for a desirable angle of attack along the length of the blade. Such a twist is desirable because the apparent wind angle changes along the length of the blade, for example due to increase in blade speed with increasing distance away from the drive hub to which the rotor blades are attached. It has been recognized by the inventors that such a progressive twist is also present in certain sections of an aerodynamic nacelle's surface, for example a nacelle which has a surface which is described by the surface of a solid of revolution. A solid of revolution is a geometric shape which is obtained by rotating a plane curve about an axis of rotation, which in the present case is typically the same as the rotational axis of the wind turbine drive hub. In a solid of revolution, each cross section of the nacelle, perpendicular to the axis of rotation, is circular. However, it is contemplated that other nacelle shapes, such as those having elliptical cross sections, can also be used. Furthermore, indentations or open cavities for accommodating rotor blades can be incorporated into the nacelle shape, which may somewhat depart from an idealized solid of revolution.

In various embodiments, a section of an aerodynamic nacelle's surface which exhibits a progressive twist can be described as follows. First, the plane curve which forms the basis for the solid of revolution is identified. The surface of the solid of revolution (or similar shape) can be described conceptually as a contiguous plurality of such plane curves, each being rotationally offset in three-dimensional space. The plane curve is typically convex, but in general might include concave and convex portions. Next, a curve is defined which lies entirely on the nacelle's surface and which crosses each of the plurality of plane curves at the same (acute) angle. The curve, roughly speaking, helically wraps at least a portion of the nacelle. Typically, the curve only wraps a portion of the way around the nacelle, for example approximately one quarter of the way around the nacelle. A region is defined on the nacelle surface which encompasses this curve. In typical cases, it can be seen that such a region exhibits a progressive twist and may be described as a helical region. An open cavity can be formed at such a region to accommodate a corresponding blade. Thus, sections of the nacelle's surface may substantially conform to inner faces of the blades.

Among all possible nacelle shapes as described above, some nacelle shapes will exhibit desirable aerodynamic properties, such as limited drag, limited disruption of air flow, and amenability to allow the nacelle to turn into the wind when pivotably mounted on a mounting apparatus such as a collapsible tripod or post supported by guy-wires. As will be readily understood by a worker skilled in the art, an aerodynamic nacelle which disrupts wind as little as possible may generally be desirable, as it results in a greater amount of wind being drawn in to rotate the blades. This is true for both upwind and downwind types of turbines. Among these shapes with desirable aerodynamic properties, a further subset of shapes will include, on their surface, sections which exhibit a progressive twist and that closely resemble a rotor blade that also has desirable aerodynamic properties. In other words, and roughly speaking, if a section were to be cut out of the nacelle surface viewed as a hollow shell, that section would be roughly suitable as a wind turbine rotor blade. The desirable aerodynamic properties of a rotor blade are described elsewhere herein, but may include one or more of: constant camber, constant pitch, and constant angle of attack in relation to apparent wind, and variable angle of attack in relation to true wind.

As such, embodiments of the present invention exhibit a nacelle shape which is aerodynamic and configured to provide, for example, limited drag during wind turbine operation. Furthermore, the rotor blades and the nacelle are shaped that each rotor blade closely resembles and conforms to a particular portion of the nacelle's outer surface, in particular portions which exhibit progressive twist. One advantage of this is that the rotor blades can be placed so that it rests substantially entirely against the nacelle body in a transportation configuration. In such a configuration, the nacelle protects the rotor blades as they have a conforming surface to rest against. Furthermore, the transportation configuration is compact with limited protruding parts, making for a suitable and convenient transportation shape.

In various embodiments, one surface (referred to as the inner surface) of each rotor blade conforms to the nacelle body. The rotor blade itself may otherwise have an arbitrary thickness or cross-sectional profile, although generally speaking the rotor blades are typically substantially flat. Suitable cross-sectional profiles can cause the rotor blade to have an airfoil shape, a cambered plate shape, or the like, as would be readily understood by a worker skilled in the art. As is also readily understood by a worker skilled in the art, the rotor blades may be thinner than they are wide, with the inner surface being one of two opposing wide surfaces.

The above approach suggests a method for co-designing a wind turbine nacelle shape with the wind turbine rotor blade shape. The surface of aerodynamic nacelle shapes can be inspected for progressively twisted portions that correspond to or at least would conform to desirably aerodynamic rotor blades. Alternatively, desirably aerodynamic rotor blades can be disposed around a common axis and their interior surfaces can be used to define a nacelle shape, such that the nacelle shape conforms to the rotor blade interior surfaces. As yet another alternative, the shape of the nacelle and the rotor blades can be developed together, for example according to an iterative procedure, so that the nacelle and the rotor blades both exhibit desirably aerodynamic properties, and such that the rotor blades can be placed so that they substantially conform to the nacelle surface, for example in a helically-wrapping manner.

It is contemplated by the inventors that suitable nacelle shapes can potentially be described as one or more of: an elliptical shape; a cylindrical, blunt, or bevelled or hemispherical shape; a conic, pointed or spherically blunted shape; a bi-conic shape; a tangent ogive, pointed or spherically blunted shape; a secant ogive shape; a parabolic shape; a bullet shape; and a Haack series shape. Such a set of shapes is not intended to be limiting. The nacelle shape, excepting the open cavities, may be generally convex. The nacelle shape may be elongated in the direction of the axis of rotation.

Although the above discussion focuses mainly on progressive twist, it is noted that the rotor blades are also curved for example in the sense that the main axis of the blade follows a curved path. Additionally, or alternatively, the blades can be curved in the sense that at least the surface of the blade that rests against the nacelle is curved in a direction perpendicular to the main axis of the blade. This may also provide for a certain cambered shape cross section of the rotor blades, for example. The blades and nacelle are also configured so that their curvatures provide desirable aerodynamic properties, and co-design of the blades and nacelle can also include design of such curvatures. The curvatures are also such that the blades conform to the nacelle in the transportation configuration.

It is noted that there are many design considerations related to nacelle and rotor blade shapes. These include structural considerations, operating range considerations and energy extraction efficiency considerations. It should be understood that the nacelle and rotor blade shapes can be optimized in a variety of ways to adequately satisfy a plurality of design considerations, as would be readily understood by a worker skilled in the art.

In some embodiments, the transportation configuration is achieved by detaching (removing) the rotor blades from the drive hub and placing them at a suitable angle around the nacelle. Each blade may be located against a separate part of the nacelle. Alternatively, two or more blades can be stacked, one on top of the other, and the two or more blades can be located together against a part of the nacelle in the stacked configuration. Stacking of blades can correspond to completely vertical stacking of blades, where the entire upper surface of one blade is covered by the entire lower surface of another blade. Stacking of blades can correspond to a partial overlap stacking of blades, where the upper surface of one blade is partially covered by a part of the lower surface of another blade. This can result in a fanned stacking configuration, for example.

Figure 8:
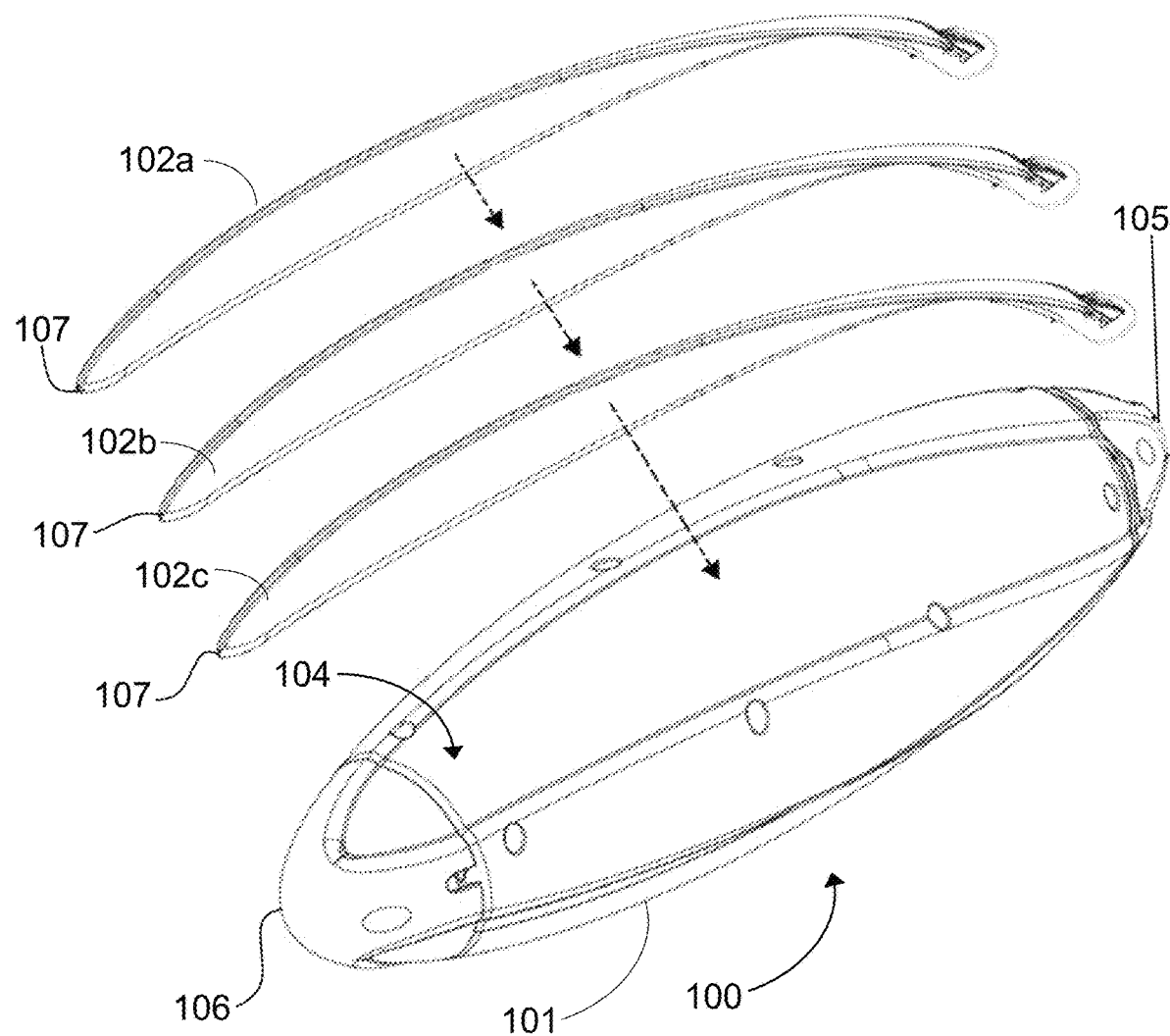
FIG. 8 is an exploded view illustrating the rotor blades arranged in a stacked configuration and housed within an open cavity of the nacelle, according to an embodiment of the present invention.

FIG. 8 illustrates an exploded view of a plurality of rotor blades 102a, 102b, 102c arranged in a stacked configuration and housed within a same open cavity 104 of the nacelle 101 in a transportation configuration 100, according to an embodiment of the present invention. The rotor blades 102a, 102b, 102c are arranged one atop another in the stacked configuration. The open cavity 104 as shown may closely fittingly accommodate the rotor blades 102a, 102b, 102c. More or fewer rotor blades may be present in the stacked configuration.

In other embodiments, to achieve the transportation configuration, the rotor blades are pivotably mounted to the drive hub and are pivoted or folded inward, without detachment, until they rest against the nacelle body.

In some embodiments, in the transportation configuration, the blades may accordingly spirally or helically wrap part of the nacelle. In some embodiments, the nacelle is smooth and convex. In some embodiments, the nacelle includes open cavities, also referred to as indentations. The open cavities may be roughly the same shape as one or more blades, and the blades can be placed within the open cavities in the transportation configuration. Such open cavities can be provided in order to achieve a more smooth shape of the disassembled wind turbine when in the transportation configuration. An equivalent to open cavities is raised ridges which are located on the nacelle's surface. The space between the ridges defines the aforementioned open cavities. Each open cavity can house a single blade or a plurality of blades, for example in a stacked configuration.

In some embodiments, a heat sink is provided and coupled to heat-producing components within the wind turbine. The heat sink may be formed around the generator for example. The heat sink may be located close to the wind turbine blades and exposed to wind, so that the wind will assist in causing heated air to be moved through the heat sink's toothed surface. In various embodiments the heat sink is located between (e.g. at the interface between) the nacelle and the rotor hub. The heat sink may have an outer surface that is shaped so as to be a continuation of the nacelle's curved (e.g. solid of revolution) shape. Thus, the heat sink's shape can be part of (or a continuation of) an aerodynamic nacelle shape as described elsewhere herein. The toothed surface of the heat sink can be configured so that the rotor blades can be hooked onto the teeth or other feature in the transportation configuration.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A portable wind turbine comprising:
    a nacelle having a curved aerodynamic shape;
    a drive hub rotatably mounted to the nacelle, the drive hub having an axis of rotation and configured to rotatably drive a generator; and
    a plurality of resilient rotor blades reconfigurable between an operating configuration and a transportation configuration; wherein:
        in the operating configuration each of the plurality of rotor blades radially extend in a respective radial direction outward from the drive hub, for imparting rotational torque, about the axis of rotation, to the drive hub in response to wind;
        wherein each blade of the plurality of rotor blades is curved and has a profile that substantially matches a profile of an exterior surface of the nacelle so that
        in the transportation configuration, at least a substantial portion of each of the plurality of rotor blades is disposed against and conforms to the exterior surface of the nacelle,
        wherein in the operating configuration, with the rotor blades being positioned downwind of the nacelle, the nacelle is shaped to create a streamlined effect to mitigate drag and support laminar wind flow at locations proximate to bases of the rotor blades, and
    wherein the portable wind turbine is a downwind turbine and the shape of the nacelle is one of:
        i. an elliptical shape;
        ii. a hemispherical shape;
        iii. a cylindrical shape with a hemispherical end;
        iv. a conic, pointed or spherically blunted shape;
        v. a bi-conic shape;
        vi. a tangent ogive;
        vii. a secant ogive shape;
        viii. a parabolic shape;
        ix. a bullet shape; and
        x. a Haack series shape.

2. The portable wind turbine of claim 1, wherein each blade of the plurality of rotor blades is shaped to have one or more substantially constant aerodynamic characteristics along a length of said blade.

3. The portable wind turbine of claim 2, wherein said substantially constant aerodynamic characteristics comprise one or more of: a substantially constant camber, a substantially constant pitch, and a substantially constant angle of attack relative to apparent wind during a prescribed operation of the wind turbine.

4. The portable wind turbine of claim 1, wherein each blade of the plurality of rotor blades is further shaped as a cambered plate or an airfoil.

5. The portable wind turbine of claim 1, wherein each blade of the plurality of rotor blades is symmetric or asymmetric in cross section.

6. The portable wind turbine of claim 1, wherein each blade of the plurality of rotor blades is shaped having a progressive twist in the radial direction.

7. The portable wind turbine of claim 6, wherein, due at least in part to said progressive twist, each blade is shaped to have a variable angle of attack relative to true wind during operation of the wind turbine.

8. The portable wind turbine of claim 6, wherein the progressive twist corresponds to a substantially constant angle of attack relative to apparent wind, at each position along a length of said blade.

9. The portable wind turbine of claim 6, wherein the progressive twist corresponds to a progressive change in direction of said blade from a first angle at an innermost portion of the blade to a second angle at an outermost portion of the blade, a difference between the first angle and the second angle being approximately 90 degrees.

10. The portable wind turbine of claim 1, wherein each blade of the plurality of rotor blades has a surface which, in the transportation configuration, rests against the nacelle, said surface being curved in a direction perpendicular to a main axis of the blade.

11. A portable wind turbine comprising:
    a nacelle having a curved aerodynamic shape;
    a drive hub rotatably mounted to the nacelle, the drive hub having an axis of rotation and configured to rotatably drive a generator; and
    a plurality of resilient rotor blades reconfigurable between an operating configuration and a transportation configuration, wherein:
        in the operating configuration each of the plurality of rotor blades radially extend in a respective radial direction outward from the drive hub, for imparting rotational torque, about the axis of rotation, to the drive hub in response to wind; each blade of the plurality of rotor blades is curved; and
        in the transportation configuration the plurality of rotor blades are disposed against and conform to an exterior surface of the nacelle,
    wherein the nacelle comprises one or more open cavities, a portion of the exterior surface being within the one or more open cavities, and wherein, in the transportation configuration, the plurality of rotor blades are disposed within and conform to said portion of the exterior surface which is within the one or more open cavities.

12. The portable wind turbine of claim 11, wherein the aerodynamic shape of the nacelle is configured to provide limited drag during operation, wherein the rotor blades are aerodynamically shaped to allow for effective capture of wind energy, and further wherein the rotor blades and the nacelle are shaped such that a surface of each blade of the plurality of rotor blades closely resembles and conforms to a particular portion of an outer surface of the nacelle when in the transportation configuration.

13. The portable wind turbine of claim 11, wherein the shape of the nacelle is symmetric about the axis of rotation, and wherein the shape of the nacelle is convex and elongated in a direction parallel to the axis of rotation.

14. The portable wind turbine of claim 11, wherein the shape of the nacelle is symmetric about the axis of rotation, and wherein the shape of the nacelle is one of:
    xi. an elliptical shape;
    xii. a cylindrical, blunt or bevelled or hemispherical shape;
    xiii. a conic, pointed or spherically blunted shape;
    xiv. a bi-conic shape;
    xv. a tangent ogive, pointed or spherically blunted shape;
    xvi. a secant ogive shape;
    xvii. a parabolic shape;
    xviii. a bullet shape; and
    xix. a Haack series shape.

15. The portable wind turbine of claim 11, wherein in the transportation configuration the plurality of rotor blades are detached from the drive hub.

16. The portable wind turbine of claim 11, wherein the plurality of rotor blades are pivotably mounted to the drive hub, and wherein reconfiguring the rotor blades from the operating configuration to the transportation configuration comprises pivoting the plurality of rotor blades inward toward the nacelle while the rotor blades remain attached to the drive hub.

17. The portable wind turbine of claim 11, wherein each of the plurality of rotor blades is housed within a different one of the open cavities.

18. The portable wind turbine of claim 11, wherein two or more of the plurality of rotor blades are housed, in a stacked configuration, within a same one of the open cavities.

19. The portable wind turbine of claim 11, wherein at least one of the open cavities is shaped to closely fittingly accommodate one of the plurality of rotor blades or to closely fittingly accommodate a predetermined number of the plurality of rotor blades arranged in a stacked configuration.

20. The portable wind turbine of claim 11, further comprising the generator, the generator being housed within the nacelle.

21. The portable wind turbine of claim 20, wherein the generator is disposed within a first end of the nacelle to which the drive hub is mounted, and wherein the nacelle includes an interior compartment located away from the first end.

22. The portable wind turbine of claim 11, further comprising electronic control circuitry housed partially or fully within the nacelle.

23. The portable wind turbine of claim 11, further comprising an electricity storage component configured to receive and store electrical energy from the electrical generator, the electricity storage component being either: removably housed within the nacelle; non-removably housed within the nacelle; or separate from the nacelle.

24. The portable wind turbine of claim 11, wherein the wind turbine is one or more of:
   person-portable;
   configured for deployment separately from a utility electrical grid;
   configured for deployment on a vehicle;
   configured for deployment on a trailer;
   configured for deployment on a marine vessel;
   configured for deployment on a marine structure;
   configured for deployment on a buoyant structure;
   configured for deployment above a body of water; and
   configured for deployment in a location susceptible to gale force or hurricane force winds.

25. The portable wind turbine of claim 11, further comprising a mounting apparatus reconfigurable between a deployed configuration and an undeployed configuration, wherein in the deployed configuration, the mounting apparatus supports and elevates the nacelle, and wherein in the undeployed configuration the mounting apparatus is collapsed.

26. The portable wind turbine of claim 25, wherein in the undeployed configuration the mounting apparatus is removed from and stowed separately from the nacelle.

27. The portable wind turbine of claim 25, wherein in the deployed configuration the nacelle is pivotably mounted, about a vertical axis, on the mounting apparatus, and further wherein the nacelle is configured to pivot about the vertical axis to turn into a true direction of wind.

28. The portable wind turbine of claim 11, wherein in the transportation configuration the plurality of rotor blades are folded against the exterior surface of the nacelle.

29. The portable wind turbine of claim 11, the rotor blades are downwind or upwind of the nacelle in the operating configuration.

30. A portable wind turbine comprising:
   a nacelle having a curved aerodynamic shape;
   a drive hub rotatably mounted to the nacelle, the drive hub having an axis of rotation and configured to rotatably drive a generator; and
   a plurality of resilient rotor blades reconfigurable between an operating configuration and a transportation configuration, wherein:
      in the operating configuration each of the plurality of rotor blades radially extends in a respective radial direction outward from the drive hub, for imparting rotational torque, about the axis of rotation, to the drive hub in response to wind;
      each blade of the plurality of rotor blades is curved; and
      in the transportation configuration the plurality of rotor blades are disposed against and conform to an exterior surface of the nacelle,
   wherein the portable wind turbine further comprises a mounting apparatus reconfigurable between a deployed configuration and an undeployed configuration,
   wherein in the deployed configuration the mounting apparatus supports and elevates the nacelle, and wherein in the undeployed configuration the mounting apparatus is collapsed and stowed within an open cavity or an interior compartment of the nacelle.

31. The portable wind turbine of claim 30, wherein the curved aerodynamic shape of the nacelle is configured to provide for limited drag during operation, wherein the rotor blades are aerodynamically shaped to allow for effective capture of wind energy, and wherein the rotor blades and the nacelle are shaped such that a surface of each blade of the plurality of rotor blades closely resembles and conforms to a particular portion of an outer surface of the nacelle when in the transportation configuration.

32. The portable wind turbine of claim 30, wherein in the transportation configuration the plurality of rotor blades are folded against the exterior surface of the nacelle.

* * * * *